United States Patent [19]
Steinbeck et al.

[11] Patent Number: 5,337,817
[45] Date of Patent: Aug. 16, 1994

[54] ROTATABLE TIRE MOUNTING DISK AND PROCESS

[75] Inventors: Horst Steinbeck, Gross-Zimmers; Johann Feith, Roedermark, both of Fed. Rep. of Germany

[73] Assignee: Schenck Auto-Service Gerate GmbH, Fed. Rep. of Germany

[21] Appl. No.: 942,742

[22] Filed: Sep. 9, 1992

[30] Foreign Application Priority Data

Sep. 27, 1991 [EP] European Pat. Off. ........ 91116532.2

[51] Int. Cl.$^5$ ............................................. B60C 25/07
[52] U.S. Cl. ................................... 157/21; 157/1.24
[58] Field of Search .................... 157/14, 16–18, 157/20–21, 1.1, 1.0, 1.24, 1.17, 1.22, 1.26, 1.28

[56] References Cited

U.S. PATENT DOCUMENTS

| | | | |
|---|---|---|---|
| 2,693,228 | 11/1954 | Rockwell | 157/1.24 |
| 3,474,840 | 10/1969 | Scott . | |
| 3,580,320 | 5/1971 | Roberts . | |
| 3,888,128 | 6/1975 | Mitchell | 157/21 X |
| 3,916,971 | 11/1975 | Carpenter et al. | 157/21 |
| 4,188,989 | 10/1978 | Wood | 269/48.1 |
| 4,478,081 | 10/1984 | Greene | 157/21 X |

FOREIGN PATENT DOCUMENTS

| | | |
|---|---|---|
| 0001855 | 5/1979 | European Pat. Off. . |
| 0169255 | 1/1986 | European Pat. Off. . |
| 1176069 | 9/1958 | Fed. Rep. of Germany . |
| 664142 | 9/1965 | France . |

OTHER PUBLICATIONS

Schenck A–S–G "Fitting Tyres with Schenck A–S–G–The Technology for Today", ASG 065 GB-8.91/2B.
Schenck A–S–G (German Equivalent) ASG 065 D–0.592/3 B.

*Primary Examiner*—D. S. Meislin
*Attorney, Agent, or Firm*—Connolly and Hutz

[57] ABSTRACT

A process for connecting and removing a mounting disk having holders for vehicle wheel rims in the mounting or removing of tires from the rim includes the use of a tire mounting device having a rotatable pin. The mounting disk and the rotatable pin are connnected together by a separable sliding splined connection. Wheel rims are releasably connected to the disk for the mounting of tires onto or the removing of tires from the wheel rims. The rims are made of various materials and have various designs, diameters and widths. Connections are without restrictions pertaining to the maximum possible clamping jaw diameter of the disk and without risk of damaging the wheel rim. The mounting disk functions to secure fragile wheel rims and the disk is easily connected to the tire mounting device.

8 Claims, 3 Drawing Sheets

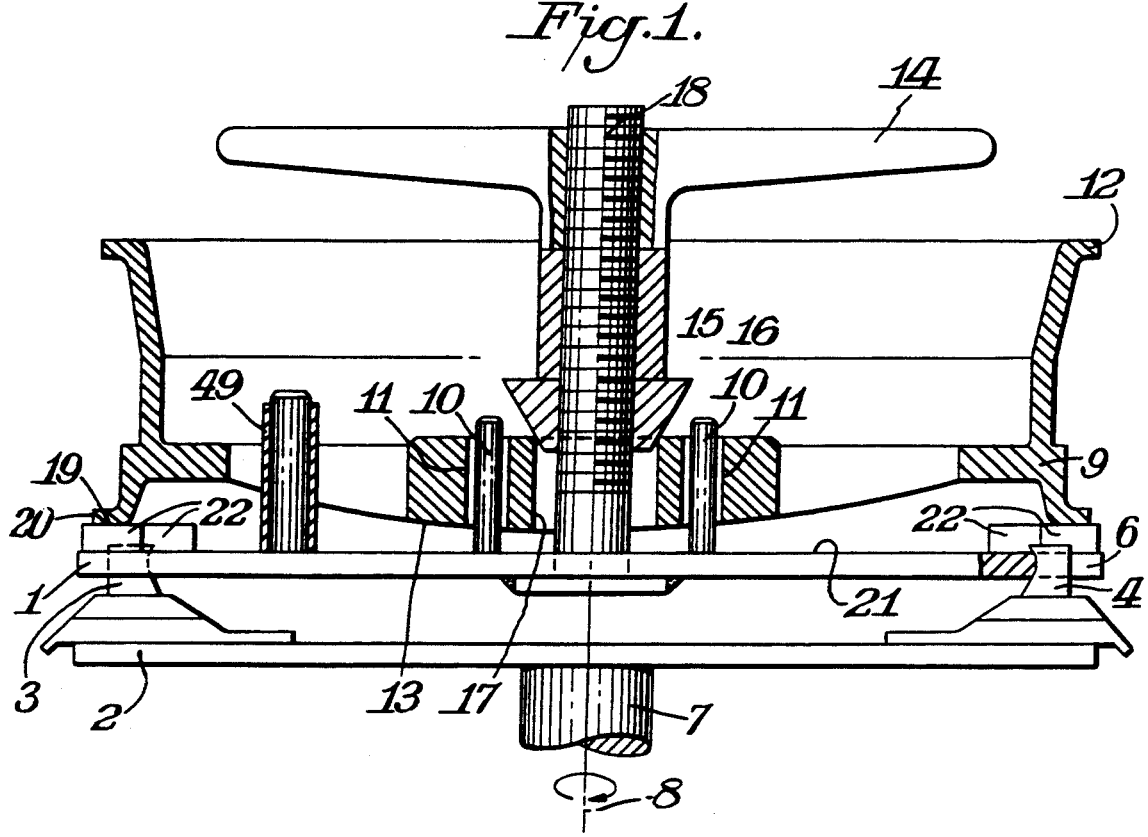
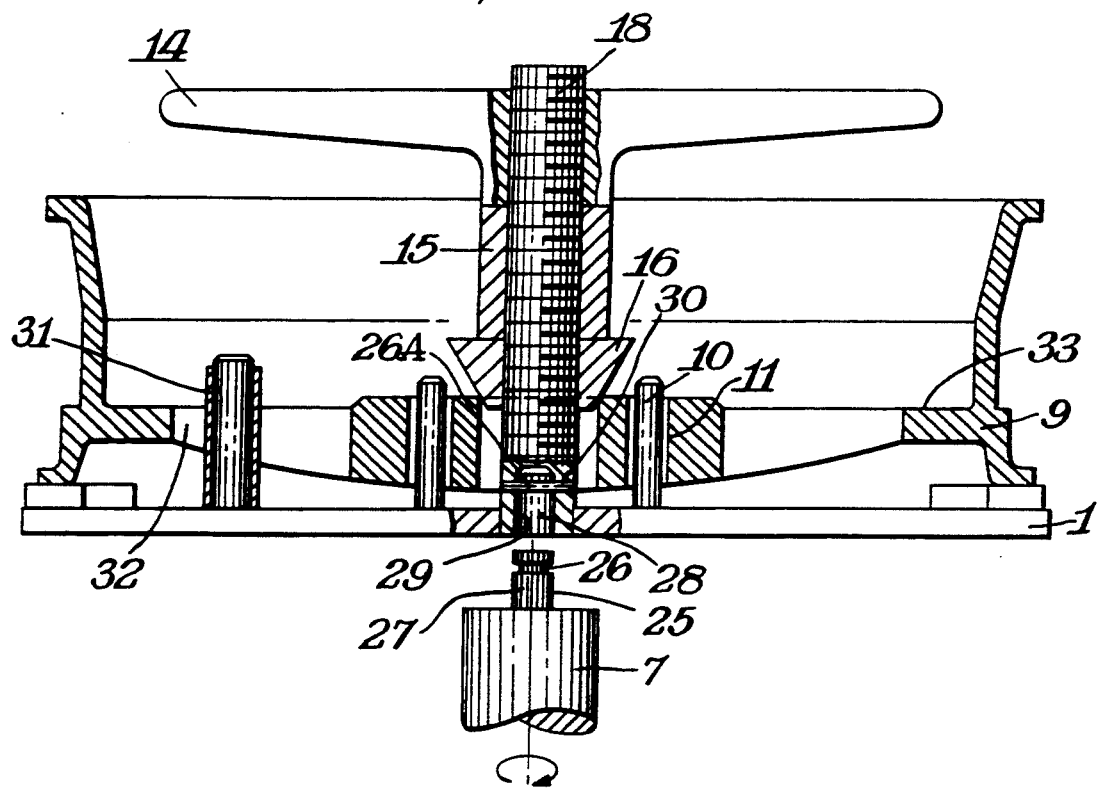

ROTATABLE TIRE MOUNTING DISK AND PROCESS

BACKGROUND OF THE INVENTION

The present invention relates to a process of connecting and removing a rotatable mounting disk having holders for vehicle wheel rims in the mounting and removing of tires. The mounting disk connects with a tire mounting device having a rotatable pin. The rotatable mounting disk with holders functions to secure vehicle wheel rims for mounting and removing tires.

The brochure called "Mounting Tires with State of the Art Schenck A-S-G-Technology" published in April of 1991 by Schenck Auto-Service-Gerate GmnH discloses a tire mounting device having radially sliding and pneumatically activated holders on a rotatable mounting disk. In order to mount a tire onto a vehicle wheel rim, these holders grap one side of the wheel rim at its wheel flange and hold the wheel rim in such a way as to be self-centering so that, using a mounting head located on a mounting arm, one side of the tire can be placed behind the freely rotating wheel flange during the mounting. After the halfway-mounted tire has been turned and the wheel rim has once again been clamped by means of the holders, the other side of the tire can likewise by completely mounted onto the wheel rim behind the wheel flange. The wheel flange is then free by means of the mounting head by rotating the rotatable disk with respect to the stationary mounting head. Subsequently, the holders securing the rim onto the wheel flange are loosened so that the compeltely mounted wheel can be removed from the tire mounting device and the tire can be filled with the correct amount of operating air pressure. When the tire is removed from the wheel rim in the opposite order, one side of the tire is first removed and then the other side of the tire is lifted over the corresponding rotating wheel flange and then released. Such tire mounting devices can always be used and are suitable for steel wheel rims. However, when the rims have a large wheel flange diameter, these devices become quite complex since holders or clamping jaws—which are pneumatically activated for the most part —can constitute a hindrance during mounting and removal of the tires since they extend over the mounting disk. Unlimited enlargement of the mounting disk can only be carried out with great difficultly. For this reason, mounting and removal devices have already been designed for large truck tires in which the axis of the mounting disk on the tire mounting device is not positioned in a vertical direction but rather in a horizontal direction.

If wheel rims made of light-metal alloys—optionally polished and coated—are used instead of steel wheel rims, and if tires with a low cross section are mounted onto these wheel rims, the forces exerted on the rotating wheel flanges are considerably increased particularly when the width of the wheel rim is increased. This leads to a substantial rise in contact pressure. Moreover, there is also a risk that, due to the smooth surface of the wheel rim, the clamped wheel rim may slip awy from the clamping jaws. This occurs because the forces exerted by the mounting head during the mounting of the tire over the freely rotating wheel flange are briefly too great. Thus, damage to or destruction of the expensive wheel rim cannot be ruled out. Similar problems occur with such wheel rims made of light-metal alloys which are cast or forged, even if the clamping is carried out from the inside to the outside instead of from the outside to the inside.

Motorcycle wheel rims which are made of light-metal alloys and which have so far always been clamped by means of clamping jaws (see European Patent No. 169,255) can also be damaged by the clamping jaws in the case of the larger tire sizes. Moreover, damage of the wheel rim shoulder or the rotating wheel flange of a wheel rim should always be avoided since this can lead to subsequent damage to the new tires being mounted. Moreover, such damage can easily cause the prescribed operating air pressure to drop in an uncontrolled manner.

SUMMARY OF THE INVENTION

Starting from the state of the art described above, the present invention is based on the task of mounting tires onto or removing tires from vehicle wheel rims made of various materials, having various shapes, various diameters and various widths without any limitation as to the maximum possible clamping jaw diameter and without the risk of damaging the wheel rim or the wheel rim shoulder, regardless of the position of the wheel rim. This task is solved in that the rotatable mounting disk and the rotatable pin are connected by means of a separable sliding connection, and in that one side of the wheel rim lies on the mounting disk coaxially in extension of the direction of the mounting disk and of the direction of the pin axis. Additionally, the position of the wheel rim with respect to the mounting disk is stabilized. In an inventive manner, the process step of centering and damping is divided into two process steps: the first step consists of securing the wheel rim in a concentric position so that no damage can occur to the wheel flange during the mounting or removal of a tire by means of the mounting head, and the second step is to stabilize the position of the wheel rim with respect to the mounting disk so that no relative movement can occur between the two of them. This solves the partial task of preventing damage to the wheel rim and of securing vehicle wheels having various configurations. The additional step of connecting rotatable pins and rotatable mounting disks by means of a separable sliding connection solves the task of securing vehicle wheel rims of any width and any size. All of the process steps together solve the complete task upon which the invention is based, that is, mounting tires onto or removing tires from wheel rims, regardless of whether the rotation axis of the wheel rim is aligned vertically or horizontally or in another direction.

A tire mounting device has a separable mounting disk. The mounting device has a pin with a groove on the circumference thereof, and the mounting disk has a central borehole with at least one groove. These grooves are connected via a spring. Also, the mounting disk has rod like carriers extending therefrom that fit into lug holes and/or between the spokes of the wheel rim to stabilize the rim relative to the disk. As a result, without damage occurring to the wheel rim, a stable transport of the wheel rim is achieved which occurs purely due to positive locking.

A splined connection is provided between the mounting disk and the pin. This makes it possible to change mounting disks problem-free without the risk of an interruption in the transmission of force between the driving pin and the driven mounting disk.

In order to further ensure the reliable connection between the mounting disk and the drive pin, a conical or tapered splined connection is provided between the mounting disk and the drive pin.

According to the present invention, a central shaft is provided facing away from the mounting disk. The mounting disk has additional carriers which can be matched with the wheel lug attachment holes of various wheel rims. Thus, the mounting disk according to the invention is quickly installed onto an already existent tire mounting device with a mounting disk, regardless of whether its mounting disk is aligned in a horizontal or vertical direction. Therefore, the mounting disk according to the invention can also be used with large wheels such as, for example, those of lightweight trucks, whose axis is generally horizontal during the mounting of tires. The positive locking and frictional locking is transferred by the clamping jaws (pneumatically, for instance) to the mounting disk according to the invention, while the wheel rim onto which a tire is to be mounted is only in frictional contact with the mounting disk. Stable transport takes place by positive locking, which is gentle to the tire side wall and the wheel flanges.

According to the invention, if the wheel lug attachment holes are not accessible or if the wheel lug attachment holes do not match the carriers on the mounting disk, one single rod like carrier at an appropriate radial distance interacts in a positive locking manner with an opening in the wheel rim bowl, thus effectuating a transport of the wheel rim in a stabilized position to the mounting disk. Such a transport according to the invention is also possible if, in the case of light-metal alloy wheel rims, in order to save time when mounting and removing the wheel rims, only one rod like carrier is used on the struts in the rim bowl. The wheel rim is then transported without effecting its stable position with respect to the mounting disk, and without the need for transport bolts to be connected through the wheel lug attachment holes to the mounting disk.

In order to increase the protection of polished or coated wheel rims made of light-metal alloys, the mounting disk may have a protective covering in order to protect the vehicle wheel rim which comes into contact with its surface. All of the rod like carriers which engage with the wheel rim likewise have protective coverings. The connection between the carriers and the mounting disk can take place via dovetailed guides, and the frictional connection between the central shaft located on the mounting disk and the center hole of the wheel rim can take place via a clamp connection.

The mounting disk has threaded boreholes for threaded pins, which penetrate the wheel lug attachment holes of the wheel rim. The mounting disk has a number of threaded boreholes extending radially to the outside to receive such threaded pins.

For direct connection of the mounting disk with the pin of the tire mounting device which supports the mounting disk, the pin of the tire mounting device has a splined surface and the mounting disk has a central borehole with mating splines.

BRIEF DESCRIPTION OF THE DRAWINGS

Novel features and advantages of the present invention in addition to those noted above will become apparent to those persons skilled in the art from a reading of the following detailed description in conjunction with the accompanying drawings wherein similar reference characters refer to similar parts and in which:

FIG. 1 is a cross-sectional view of a mounting disk with a vehicle wheel rim located thereon and with the mounting disk connected to a tire mounting device (not shown) by the clamping jaws of that device, according to the present invention;

FIG. 2 is a cross-sectional view of a mounting disk directly connected with the pin of a tire mounting device (not shown), according to the present invention;

DETAILED DESCRIPTION OF THE INVENTION

Figure 3:
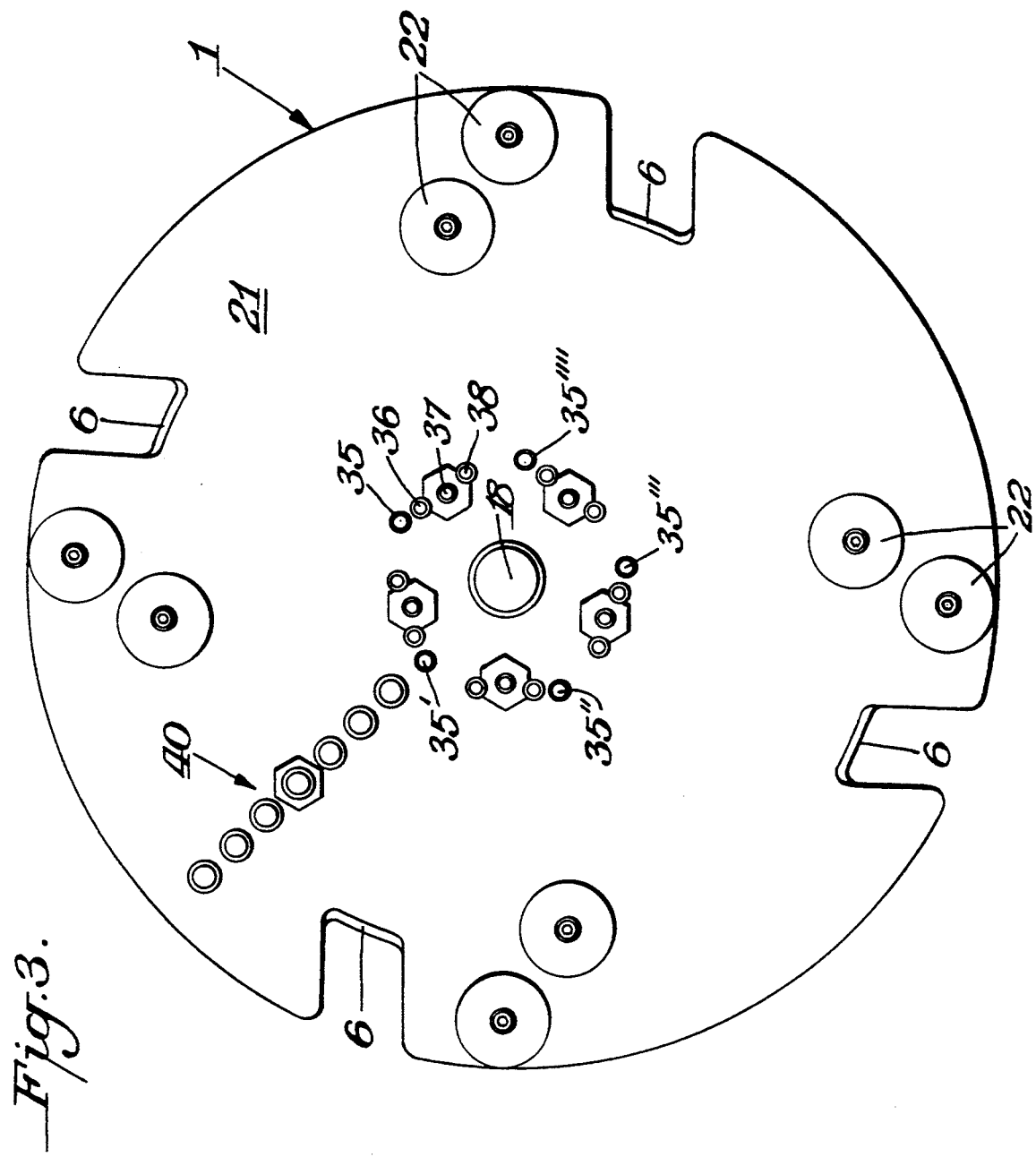
FIG. 3 is a top plan view of a mounting disk, according to the present invention.

Referring in more particularlity to the drawings, FIG. 1 shows a wheel rim mounting disk 1 held by movable jaws 3, 4 located on a basic mounting disk 2. The jaws 3, 4 enter slotted portions or slits 6 on the periphery of the disk 1.

The basic mounting disk 2 is connected to a tire mounting device (not shown) and is rotated by a pin 7. In this context, it makes no difference whether the pin axis 8 is aligned in a vertical or horizontal direction.

In accordance with the embodiment shown in FIG. 1, a wheel rim 9 made of a light-metal alloy is secured to the mounting disk 1 by pins 10, which extend through wheel lug attachment holes 11 in such a way that the position of the wheel rim is immovable with respect to the mounting disk 1. The pins 10, which function as carriers, have the effect that forces which arise cannot cause even the slightest shift of the wheel rim 9 with respect to the mounting disk 1 during the mounting or removal of a tire. These are forces which would be transmitted via the wheel flange which faces in an inward direction during operation, or in other words, the wheel flange facing the vehicle. These forces would inevitably lead to damage of the outwardly facing surface 13.

In order to prevent damage to the outer shoulder 19 of the wheel rim 9 or damage to the wheel flange 20 during the tightening of the wheel rim 9 on the mounting disk 1 by nut 14, a connecting piece 15 and a cone 16 are provided between the center hole 17 of the wheel rim 9 and the nut 14. A threaded pin 18 extends outwardly from the mounting disk 1, and the nut engages the threads on the pin. Plastic disks 22 on the surface 21 of the mounting disk 1 face the wheel rim 9 according to the embodiment of FIG. 1.

After the tire has been mounted via the wheel flange 12 of the wheel rim 9, the wheel rim 9 is released by loosening of the nut 14. The wheel rim is turned over with the partially mounted tire so that wheel flange 12 now comes to lie on the plastic disks 22. Then the wheel rim is once against secured by tightening the nut 14, but without the connecting piece 15 and optionally with the cone 16. Moreover, the length of the pins 10 as carriers is dimensioned in such a manner that, even when the wheel rim 9 is turned over, pins 10 penetrate the wheel lug attachment holes 11. A firm stabilization is assured.

FIG. 2 illustrates direct connection of the mounting disk 1 with the pin 7 of the tire mounting device (not shown).

The pin 7 has a tapered head piece 25 which is provided with an encircling groove 26. The head piece 25 also has splines 27 on the outer surface thereof which engage and mate with complementary splines 28 (see FIG. 4) in the mounting disk 1 during the assembly. This mating relationship permits the transmission of the force needed for rotation.

In the embodiment according to FIG. 2, the threaded pin 18, which can be screwed or welded to the mounting disk 1, has a central conical borehole 29 and the splines 28 are located on the surface of this hole.

The locking of the separable connection between the head piece 25 of the pin 7 of the tire mounting device and the mounting disk 1 including its accessories is achieved by a snap-action clasp in which a spring pin 26A is placed into a borehole 30. This spring pin deflects in the radial direction when the head piece 25 slides into the borehole 29 as a result of its springy properties. When the encircling groove 26 reaches the spring pin, the pin snaps into this groove thus holding both parts together in such a manner that they cannot shift. When the mounting disk 1 is removed from the head piece 25 of the pin 7 of the tire mounting device, the spring pin 26A merely has to be taken out of the borehole 30 which is located in the threaded pin 18. For this purpose, it is practical for the spring pin to have a larger diameter at one end so that it is easier to handle.

As shown in FIG. 2, locking of the wheel rim 9 is likewise carried out by means of the nut 14, the connecting piece 15 and the cone 16. Stable transport of the wheel rim 9 is effectuated by another carrier 31 which engages between spokes 32 of the wheel rim 9. In this case, the pins 10 which penetrate the wheel lug attachment holes 11 may not be necessary. Stable transport occurs by way of another carrier 31 which engages between the spokes 32 of the wheel rim 9 in the embodiment according to FIG. 2.

In the case of wheel rims with unusual wheel lug attachment holes, it is not at all necessary to create a new configuration of the pins 10 on the mounting disk in order to make the pins 10 engage with the unusual wheel lug attachment holes of the wheel rim. Instead, in such cases, the carrier 31 effectuates a stable transport of the wheel rim 9 by means of an opening in the wheel rim bowl 33 of the wheel rim 9. Such a transport is especially convenient for wheel rims made by different manufacturers or for motorcycle wheel rims or for the wheel rims of trucks.

Instead of securing the wheel rim 9 by the nut 14 and the threaded pin 18, it is also possible to select any other tightening technique. For example, instead of the threaded pin 18, it is possible to use a smooth pin which engages with a clamp connection substituting for the nut 14.

The top view of the mounting disk 1 shown in FIG. 3 is a preferred embodiment of the mounting disk 1, when it is used with the movable jaws 3, 4 (see FIG. 1) of an already existing tire mounting device. The plastic disks 22 are arranged on the surface 21 of the mounting disk 1 facing the wheel rim in such a manner that wheel rims of different diameters can be secured without sustaining damage. Instead of these plastic disks 22, however, a smooth, abrasion-proof covering 34 (see FIG. 4) can cover the entire surface 21 of the mounting disk 1. Consequently, the range of application of the mounting disk 1 is considerably expanded.

In FIG. 3, groups of threaded boreholes 35, 36, 37 and 38 are arranged in a circle around the threaded pin 18. In this embodiment, every single threaded borehole 35, 36, 37 and 38 has another matching threaded borehole in each of the 4 additional borehole groups. A borehole 35 in the embodiment, for example, engages with the boreholes 35', 35'', 35''' and 35''''. In other words, these are five-hole wheel rims, i.e. there are five wheel lug attachment holes 11 for each wheel rim 9. In this embodiment, the common configurations of such wheel lug attachment holes are used in order to already position the matching boreholes in the mounting disk.

The top view of FIG. 3 shows a row 40 of threaded boreholes extending in a radially outward direction. These threaded boreholes serve to hold the other carrier 31 only by means of which a stable transport is effectuated. For example, in case of a deviating configuration of the wheel lug attachment holes, for instance, the holes of a four-hole wheel rim do not have to be again installed in the mounting disk. In order to speed up mounting tires onto and removing tires from wheel rims, it is also possible to screw only the other carrier into the threaded bolts 40 instead of the threaded borehole 35 through 38 and the matching ones.

Figure 4:
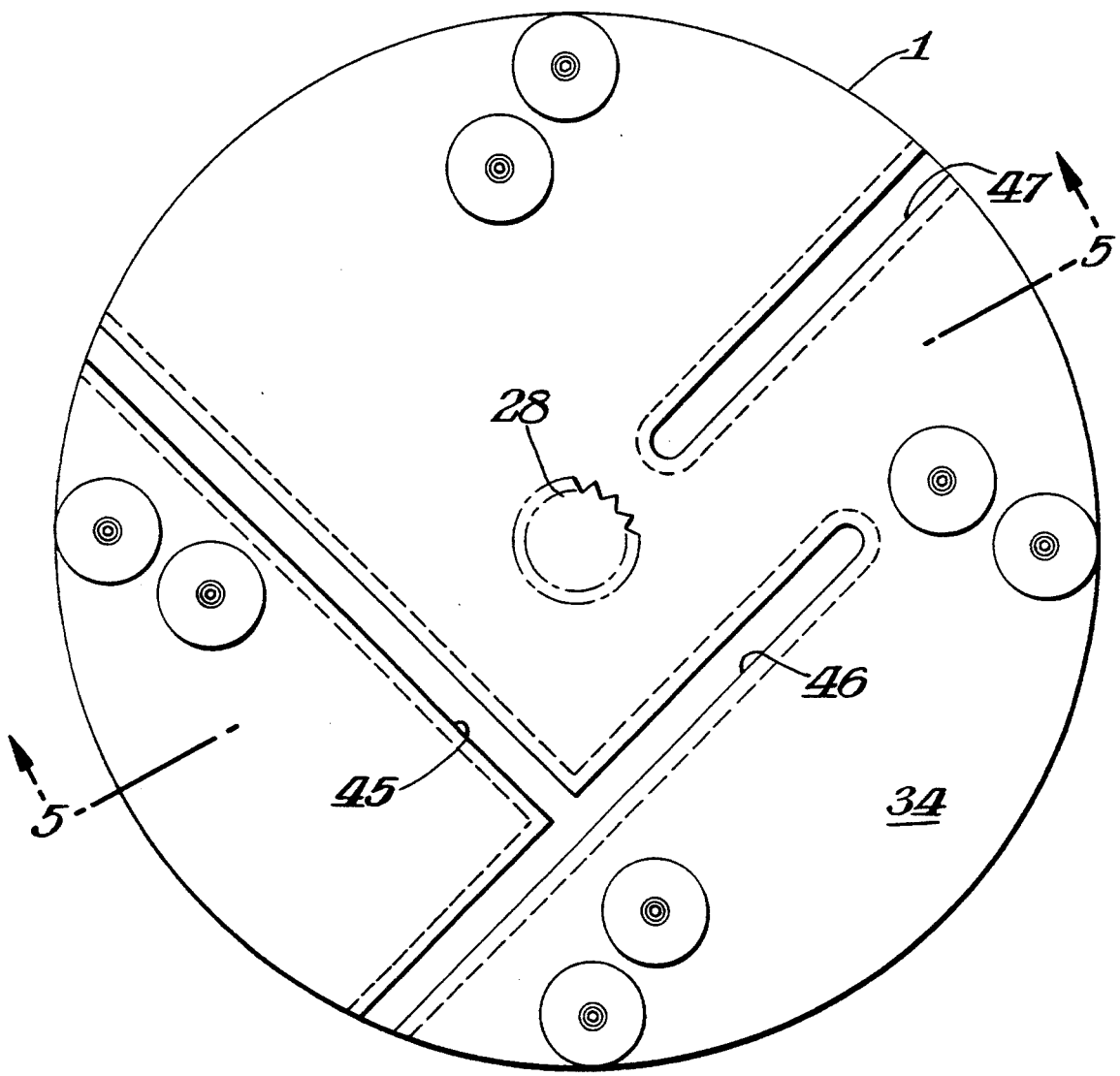
FIG. 4 is a top plan view of another mounting disk, according to the present invention.
Figure 5:
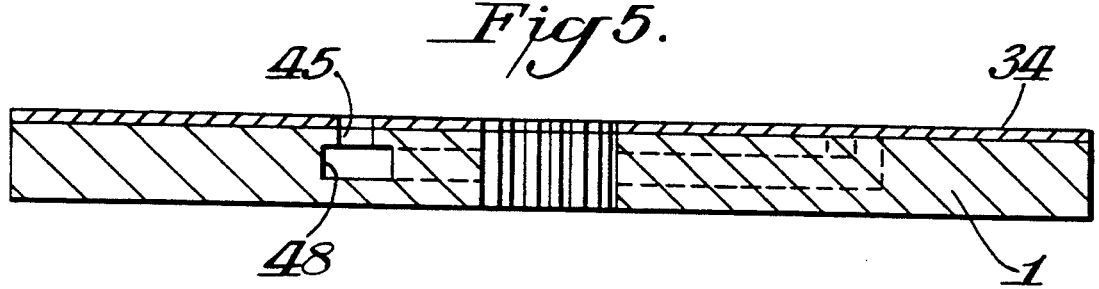
FIG. 5 is a sectional view taken along line 5—5 of FIG. 4.

The top view of the mounting disk 1 shown in FIG. 4 as well as the cross sectional view of FIG. 5 illustrate an embodiment of the mounting disk 1 in which dovetailed slots 45, 46, 47 are provided instead of threaded boreholes. Slots 45 and 46 intersect in a T-formation while the other dovetailed slot 47 extends radially outwards at an angle of 45°. Dovetailed slot 47 is the replacement for the row 40 of threaded boreholes shown in FIG. 3. In this manner, when a carrier with an end shaped to mate with the dovetail is used, it is possible for any desired opening of a wheel rim to be placed in a stable position with respect to the mounting disk. This provides stable transport without causing any damage when the wheel rim is secured to the mounting disk by means of a central locking mechanism such as shown in FIGS. 1 and 2. In the cross section of the mounting disk 1 shown in FIG. 5, a slotted channel 48 of the dovetailed slot 45 is shown. In this slot channel 48, a carrier with a dovetail foot can be moved in any desired manner and thus, for example, be adjusted to a matching wheel lug attachment hole of a four-hole or five-hole wheel rim.

In the embodiment according to FIGS. 4 and 5, it is also possible to use two dovetailed slots 46 meeting in a T-formation at an angle of 90°. Sometimes, it is sufficient when only two carriers grasp two wheel lug attachment holes, thus effectuating a stable transport of the wheel rim 9. However, by increasing the dovetailed slots 45, 46 to several such slots, it is also possible for any kind of wheel rim to undergo stable transport in every wheel lug attachment hole.

The splines 28 in the central borehole of the mounting disk 1 serve to directly connect the mounting disk either with the pin 7 of the tire mounting device or the head piece 25 of the pin 7.

An abrasion-proof covering 34 shown in FIGS. 4 and 5 serves as a sheathing (see FIG. 2) for the additional carrier. Also, the pins 10 which function as carriers can also be provided with a abrasion-proof sheathing 49.

What is claimed is:

1. A tire mounting device having a removable rotatable mounting disk with holders for securing vehicle rims for mounting or removing tires, and a rotatable pin connected to and extending from the tire mounting device supporting the rotatable mounting disk, at least one groove on the circumference of the pin, a central borehole in the mounting disk with at least one internal groove, a spring pin positioned between and in engagement with the grooves for releasably holding the mounting disk and rotatable pin together, and the holders on the mounting disk including rods connected to and extending from the mounting disk parallel to each other, one rod coaxial to the central borehole and at least one other rod for engaging the vehicle rim.

2. A tire mounting device as in claim 1 wherein the rotatable pin includes an outer surface with splines and the central borehole has a splined interior constructed and arranged to matingly engage the splines on the rotatable pin when the rotatable pin and mounting disk are connected together.

3. A tire mounting device as in claim 2 wherein the splined outer surface on the rotatable pin is tapered and the splined interior of the borehole is conical.

4. A rotatable mounting disk having holders for securing vehicle rims for mounting tires to or removing tires from the rims, the vehicle rims having varying mounting openings therein, the disk including a central shaft extending therefrom, slotted portions in the disk and movable jaws slidably fitted into the slotted portions for securing the disk in place, groups of boreholes in the disk surrounding the central shaft and a plurality of boreholes in the disk arranged in a radially outward direction, and at least one rod constructed and arranged for placement into an opening in the vehicle rim and for engagement with one of the boreholes in the disk for fixing the rim relative to the rotatable disk.

5. A rotatable mounting disk as in claim 4 including a protective covering on the surface of the disk and the surface of the rod.

6. A rotatable mounting disk as in claim 4 wherein the boreholes are threaded on the interior surfaces thereof and the rod is externally threaded to mate with a threaded borehole.

7. A rotatable mounting disk as in claim 6 including a protective covering on the surface of the disk and the surface of the rod.

8. A rotatable mounting disk as in claim 4 in combination with a rotatable pin for supporting and rotating the mounting disk, the pin having an outer surface with splines, and a central borehole on the mounting disk having a splined interior constructed and arranged to matingly engage the splines on the rotatable pin when the rotatable pin and mounting disk are connected together.

* * * * *